US012800330B2

(12) United States Patent
Holder et al.

(10) Patent No.: US 12,800,330 B2
(45) Date of Patent: Nov. 17, 2026

(54) METHOD FOR PROVIDING A MESSAGE COMPRISING A STARTING TIME OF A PREDICTED NAVIGATION ROUTE TO A USER OF THE VEHICLE, COMPUTER-READABLE MEDIUM, SYSTEM, VEHICLE, AND MOBILE TERMINAL

(71) Applicant: Bayerische Motoren Werke Aktiengesellschaft, Munich (DE)

(72) Inventors: Stefan Holder, Munich (DE); Martin Wernwag, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 229 days.

(21) Appl. No.: 18/566,058

(22) PCT Filed: Mar. 7, 2022

(86) PCT No.: PCT/EP2022/055678
§ 371 (c)(1),
(2) Date: Nov. 30, 2023

(87) PCT Pub. No.: WO2023/274586
PCT Pub. Date: Jan. 5, 2023

(65) Prior Publication Data
US 2024/0240957 A1 Jul. 18, 2024

(30) Foreign Application Priority Data
Jun. 30, 2021 (DE) ..................... 10 2021 116 780.9

(51) Int. Cl.
*G01C 21/36* (2006.01)
*G01C 21/34* (2006.01)
*G08G 1/01* (2006.01)

(52) U.S. Cl.
CPC ..... *G01C 21/3617* (2013.01); *G01C 21/3484* (2013.01); *G08G 1/0129* (2013.01)

(58) Field of Classification Search
CPC ............ G01C 21/3617; G01C 21/3484; G01C 21/3655; G08G 1/0129; G07C 5/0841
See application file for complete search history.

(56) References Cited

U.S. PATENT DOCUMENTS 9,557,187 B2 * 1/2017 Schuurbiers ....... G06Q 10/1093
2005/0125148 A1 6/2005 Van Buer et al.
(Continued)

FOREIGN PATENT DOCUMENTS

CN 102538809 A 7/2012
CN 108286980 A * 7/2018 ......... G01C 21/3484
(Continued)

OTHER PUBLICATIONS

Machine Translation of CN-108286980-A (Year: 2018).*
(Continued)

*Primary Examiner* — Sahar Motazedi
(74) *Attorney, Agent, or Firm* — Maginot, Moore & Beck LLP

(57) ABSTRACT

A method provides a message comprising a starting time of a predicted navigation route. The method includes receiving a last vehicle position of a journey of the user using the vehicle, and determining a current vehicle location using the received last vehicle position. The method also includes predicting a departure time window for a start of a next journey, a destination of the next journey, and a probability for the start of the next journey to the predicted destination in the predicted departure time window on the basis of the determined current vehicle location. If the probability exceeds a specified threshold, then a navigation route, an estimated journey time, and a starting time are determined.
(Continued)

Also, the message comprising the starting time of the predicted navigation route is transmitted if the starting time of the predicted navigation route corresponds to a current time.

19 Claims, 1 Drawing Sheet

(56) References Cited

U.S. PATENT DOCUMENTS

| | | | | |
|---|---|---|---|---|
| 2007/0038372 | A1 | 2/2007 | Kudo et al. | |
| 2009/0282072 | A1* | 11/2009 | Nagase | G06F 16/29 707/999.102 |
| 2011/0238289 | A1 | 9/2011 | Lehmann | |
| 2014/0278071 | A1 | 9/2014 | San Filippo et al. | |
| 2014/0278086 | A1 | 9/2014 | San Filippo et al. | |
| 2015/0134244 | A1 | 5/2015 | Hershey et al. | |
| 2018/0136003 | A1* | 5/2018 | Perkins | G01C 21/362 |
| 2020/0298825 | A1* | 9/2020 | Kurihashi | B60W 20/12 |
| 2021/0312326 | A1* | 10/2021 | Song | G01C 21/3484 |

FOREIGN PATENT DOCUMENTS

| | | | |
|---|---|---|---|
| DE | 102007001734 | A1 | 7/2008 |
| DE | 102012023109 | A1 | 6/2014 |
| DE | 102015203261 | A1 | 9/2015 |
| EP | 3205982 | A2 | 8/2017 |

OTHER PUBLICATIONS

International Search Report corresponding to International Patent Application No. PCT/EP2022/055678, dated Aug. 12, 2022 (4 pages).

Written Opinion corresponding to International Patent Application No. PCT/EP2022/055678, dated Aug. 12, 2022 (8 pages).

German Search Report corresponding to German Patent Application No. 10 2021 116 780.9, dated Dec. 6, 2021. (5 pages).

Chinese Office Action corresponding to Chinese Patent Application No. 202280037141.3, dated Apr. 13, 2026. (8 pages).

English Translation of Chinese Office Action corresponding to Chinese Patent Application No. 202280037141.3, dated Apr. 13, 2026. (10 pages).

* cited by examiner

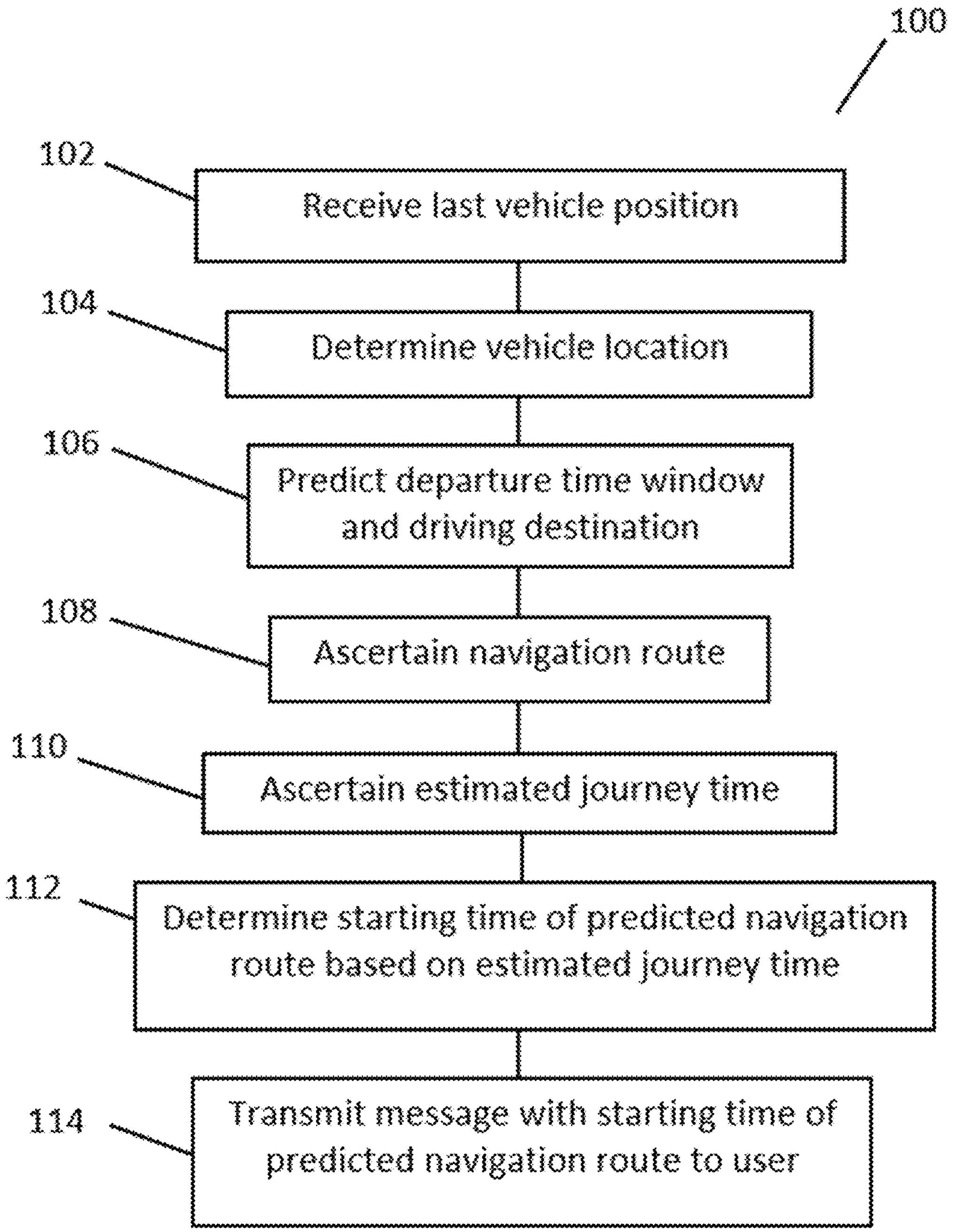
100
102
Receive last vehicle position
104
Determine vehicle location
106
Predict departure time window and driving destination
108
Ascertain navigation route
110
Ascertain estimated journey time
112
Determine starting time of predicted navigation route based on estimated journey time
114
Transmit message with starting time of predicted navigation route to user

METHOD FOR PROVIDING A MESSAGE COMPRISING A STARTING TIME OF A PREDICTED NAVIGATION ROUTE TO A USER OF THE VEHICLE, COMPUTER-READABLE MEDIUM, SYSTEM, VEHICLE, AND MOBILE TERMINAL

The present application is the U.S. national phase of PCT Application PCT/EP2022/055678 filed on Mar. 7, 2022, which claims priority of German patent application No. 102021116780.9 filed on Jun. 30, 2021, which is incorporated herein by reference in its entirety.

TECHNICAL FIELD

The disclosure relates to methods and apparatus for providing a message comprising a starting time of a predicted navigation route to a user of the vehicle.

BACKGROUND

Navigation applications in vehicles and on mobile terminal devices can inform a driver of a vehicle after the destination has been entered whether there is more traffic than usual on the planned navigation route to the destination. In addition, navigation applications can proactively inform the user of a vehicle about a journey time to a destination at the start of the journey.

It is an object of the disclosure to provide a starting time for a predicted navigation route to a user of a vehicle in an efficient manner. In particular, one object of the disclosure is to efficiently provide a starting time for a predicted navigation route to a predicted destination and for a predicted departure time to the user of the vehicle, so that the user of the vehicle can reach the predicted destination on time.

SUMMARY

The above-stated objects, as well as others, are achieved by at least some advantageous embodiments and developments disclosed herein.

A first aspect is characterized by a method for providing a message comprising a starting time of a predicted navigation route to a user of the vehicle. The method can be a computer-implemented method. The method is preferably carried out on a vehicle-external server. Alternatively, the method can be carried out on an engine control unit or computer of the vehicle. Alternatively, the method can be carried out on a combination of the vehicle-external server and control unit or computer of the vehicle. The vehicle can be a motor vehicle. The method comprises receiving a last vehicle position of a journey of the user with the vehicle. The last vehicle position can be a vehicle position ascertained using a global satellite navigation system. Preferably, the last vehicle position is received from the vehicle by a vehicle-external server.

The method further comprises determining a current vehicle location using the received last vehicle position of the journey of the user. The current vehicle location can be a cluster of vehicle positions representing the current vehicle location. The method further comprises predicting a departure time window for the start of the next journey, a destination of the next journey, and a probability for the start of the next journey to the predicted destination in the predicted departure time window for the user of the vehicle on the basis of the determined current vehicle location. If the probability of the beginning of the next journey to the predicted destination in the predicted departure time window exceeds a specified threshold value, the method ascertains a navigation route of the user of the vehicle to the predicted destination, the method determines the estimated journey time of the ascertained navigation route of the user of the vehicle to the predicted destination, and the method determines the starting time of the predicted navigation route on the basis of the ascertained estimated journey time. Furthermore, the method transmits the message comprising the starting time of the predicted navigation route to the user of the vehicle if the starting time of the predicted navigation route corresponds to the current time.

Advantageously, the method can notify a user of the vehicle proactively about the starting time a of predicted navigation route, so that the user can reach the destination on time using the predicted navigation route, taking into account a current traffic situation, when the user begins the journey with the vehicle at the starting time. No manual settings are required for the user of the vehicle regarding the navigation destination and/or the navigation route. The navigation system of the vehicle learns the user's behavior dynamically. Furthermore, the navigation system of the vehicle can efficiently assist the user in planning journeys with the vehicle more easily and in making journeys, especially regularly recurring journeys, with the vehicle. The use of the vehicle by the user is efficiently simplified by the vehicle efficiently assisting the user in planning the starting time of a journey.

According to an exemplary embodiment, the method can further comprise, if the probability of the start of the next journey to the predicted destination in the predicted departure time window does not exceed the specified threshold value, predicting a new departure time window for the start of the next journey, a destination of the next journey, and a probability of the start of the next journey to the predicted destination in the predicted time window for the user of the vehicle on the basis of the determined current vehicle location after expiry of a first, specified time interval. This allows efficient control over the prediction of the next journey with the vehicle.

According to one or more embodiments, ascertaining the navigation route of the user of the vehicle to the predicted destination can comprise ascertaining a preferred navigation route of the user of the vehicle as the navigation route of the user, and ascertaining a fastest navigation route as the navigation route of the user, if no preferred navigation route of the user of the vehicle has been determined. This allows the navigation route to the predicted destination to be efficiently adapted to the user of the vehicle.

According to some embodiments, ascertaining the estimated journey time of the ascertained navigation route of the user of the vehicle to the predicted destination can comprise determining a starting time for ascertaining an estimated journey time of the ascertained navigation route of the user of the vehicle to the predicted destination, and ascertaining the estimated journey time of the ascertained navigation route of the user of the vehicle to the predicted destination as soon as the starting time for ascertaining the estimated journey time of the ascertained navigation route is reached. This allows efficient control over ascertaining the estimated journey time. The estimated journey time is ascertained only at the times and/or time intervals relevant to the user.

According to some embodiments, the method can further comprise terminating the method, in particular a current step of the method, if a movement of the vehicle is detected. This can effectively prevent the user from receiving messages at starting times that are out of date and/or no longer relevant to the user of the vehicle.

According or more exemplary embodiments, the method can further comprise monitoring the start of the journey after the message has been provided to the user of the vehicle. If the journey does not start after the message is provided to the user of the vehicle, the method can predict a new departure time window for the start of the next journey, a destination of the next journey, and a probability of the start of the next journey to the predicted destination in the predicted time window for the user of the vehicle on the basis of the determined current vehicle location after expiry of a second, specified time interval. This allows the method to be efficiently adapted to the user's behavior regarding the start of the journey.

According to some embodiments, the departure time window can be increased if no departure time window has been predicted, for which the probability of the start of the next journey to the predicted destination in the predicted departure time window exceeds the predetermined threshold value. This allows the departure time window to be efficiently adjusted such that the user is provided with a starting time for a relevant navigation route to a relevant, predicted destination by means of a message. The relevance of the information provided to the user can be efficiently increased.

A further aspect is characterized by a computer-readable medium for providing a message comprising a starting time of a predicted navigation route to a user of the vehicle, wherein the computer-readable medium comprises instructions that, when executed on a computer and/or a control unit, carry out the method described above.

A further aspect is characterized by a system for providing a message comprising a starting time of a predicted navigation route to a user of the vehicle, wherein the system is designed to carry out the method described above.

A further aspect is characterized by a vehicle comprising the system described above for providing a message comprising a starting time of a predicted navigation route to a user of the vehicle.

A further aspect is characterized by a mobile terminal device comprising the system described above for providing a message comprising a starting time of a predicted navigation route to a user of the vehicle.

Additional features arise from the claims, the figures and the description of the figures. All the features and feature combinations cited in the description above, and the features feature combinations cited in the description of the figures below and/or shown in the figures alone are applicable not only in the respective combination indicated, but also in other combinations or else in isolation.

In the following, an exemplary embodiment is described by reference to the attached drawings. This will reveal further details, preferred embodiments and extensions of the.

BRIEF DESCRIPTION OF THE DRAWINGS

FIG. 1 shows an exemplary method for providing a message comprising a starting time of a predicted navigation route to a user of the vehicle.

DETAILED DESCRIPTION

In detail, FIG. 1 shows an exemplary method 100 for providing a message comprising a starting time of a predicted navigation route to a user of the vehicle. The method 100 can be carried out on a vehicle-external server, for example a backend server. If the method 100 is carried out on the vehicle-external server, control units of the vehicle can remain in an energy-saving sleep mode. The one or more control units of the vehicle required to carry out the method 100 need not be woken up to carry out the method 100. Alternatively, the method 100 can be carried out on one or more control units of the vehicle. If the method 100 is carried out on one or more control units of the vehicle, no user-related data is transmitted to the vehicle-external server. If the user does not consent to a data transfer to the vehicle-external server, the method 100 can be carried out in the vehicle. The user of the vehicle can thus use the method 100 independently of any consent to data transmission to the vehicle-external server. The user-related data may be data from a mobility profile of a user of the vehicle. The mobility profile may include past navigation routes, vehicle locations, vehicle positions, destinations, and/or departure times. The method 100 can use the data of the mobility profile depending on a user-related data release for carrying out the method 100. The user can release the data of the mobility profile via an app on a mobile terminal device and/or enable a function of a vehicle.

The method 100 is preferably carried out on a user-specific basis. The starting time of a predicted navigation route is calculated and provided individually for each user of the vehicle. A user-specific message is provided to each user of the vehicle. The method 100 can receive 102 a last vehicle position of a journey of the user with the vehicle. For example, the vehicle-external server can receive 102 the last vehicle position of a journey by the user from the vehicle. The last vehicle position of the journey is transmitted from the vehicle to the external server preferably in real time, or approximately in real time. The vehicle-external server thus has a current, latest vehicle position available, so that the method 100 can also notify the user of a brief stay by the user at the last vehicle position before the start of the next journey.

The method 100 can determine 104 a current vehicle location using the received last vehicle position of the user's journey. The last vehicle position received can be a vehicle position of a global navigation satellite system, or GNSS for short. The received last vehicle position may vary slightly in terms of vehicle location. For example, e vehicle may be parked in slightly different parking spaces on a road or in a parking garage, all of which are located near a user's home or workplace. Furthermore, the GNSS vehicle position may vary due to an inaccuracy in determining the GNSS vehicle position. By determining the current vehicle location, inaccuracies of GNSS vehicle positions and/or different parking positions and/or parking locations can be efficiently taken into account. For example, the current vehicle location can be determined by calculating clusters for all past final vehicle positions. Known algorithms such as DBSCAN and/or agglomerative clustering can be used to calculate the clusters. If clusters have already been calculated for all past final vehicle positions, a center point of a cluster located nearest the last vehicle position received can be ascertained as the current vehicle location.

The method 100 can predict 106 a departure time window for the start of the next journey, a destination of the next journey, and a probability for the start of the next journey to the predicted destination in the predicted departure time window for the user of the vehicle on the basis of the determined current vehicle location. In addition or alternatively, the method 100 can predict an arrival time window. The steps described below can be applied in an analogous manner to the prediction of an arrival window. The following describes the prediction of the departure time window in detail. The departure time window for the start of the next journey and the destination can be predicted in different ways. In a first option, only the departure time window for the start of the next journey can be predicted first, followed by the probability for the destination, assuming that the next journey takes place in the predicted departure time window. The probability P for the start of the next journey to the predicted destination Z in the predicted departure time window F is obtained as follows:

$$P(\text{next journey to } Z \text{ within } F) = P(\text{next journey within } F) * P(\text{journey to } Z \mid \text{next journey within } F) \quad (1)$$

The departure time window for the start of the next journey can be calculated by searching for a time window with a fixed duration, for example a time window of 30 minutes, within a specified time interval, for example within a specified time interval of 24 h from the end of the last journey, which maximizes the probability of the start of the next journey. Examples of time windows are: 5:00 p.m. to 5:30 p.m., 5:30 p.m. to 6:00 p.m., or 6:00 p.m. to 6:30 p.m. Alternatively, the fixed-duration time window can be shifted by small steps, for example 5 min, to find a departure time window with a greater departure probability. Examples of time windows are: 5:00 p.m. to 5:30 p.m., 5:05 p.m. to 5:35 p.m., or 5:10 p.m. to 5:40 p.m. A departure probability within a time window can be calculated using historical departure times of a user at the current vehicle location. The time window with the highest departure probability can be predicted as the departure time window.

The departure probability within a time window is determined on the basis of the current vehicle location ascertained, as follows:

P (Start of next journey in time window F when vehicle is at vehicle location A at time t)=Number of past events in which vehicle was at vehicle location A at time t and the start of the journey took place in time window F/(Number of past events in which vehicle was at vehicle location A at time t and the start of the journey took place in time window F+parameter k), where the parameter k is a non-negative real number. The parameter k is used to reduce the probability in cases where there is little historical data available.

In order to calculate P (Journey to Z| Next journey within F), the simplifying assumption can be made that the next journey will take place in the middle of the time window F or at a different time within the time window F. This has the advantage that an algorithm for destination prediction can be used. For example, the destination prediction algorithm can predict the destination on the basis of the current vehicle location and the current time. In detail, the destination of the next journey can be predicted with a classification algorithm that determines a probability for each possible destination of the vehicle. The destination can be a vehicle location, which, as described above, has been ascertained by means of a known clustering algorithm using historical vehicle positions of the user. The predicted destination can correspond to the vehicle location, or the cluster representing the vehicle location, with the highest probability. In order to predict a geo-position as the destination, a cluster center can be calculated. For example, the cluster center can be calculated using an arithmetic mean of all geo-positions of vehicle positions of the cluster.

Specifically, the following features can be used to predict the destination:

- Vehicle position at the start of a current journey;
- Vehicle location at the beginning of a journey; current
- Vehicle positions at the beginning of a current journey and of n last journeys, where n=1, 2, 3, 4, . . . ;
- Vehicle locations at the start of a current journey and of n last journeys, where n=1, 2, 3, 4, . . . ;
- Time of day;
- Absolute time, e.g. number of seconds since Jan. 1, 1970 00:00 hours
- Day of the week;
- Seat occupation; and/or
- Current vehicle position and/or n last vehicle positions during a current journey.

The prediction can be performed using a known statistical model and/or using a trained machine learning method. Examples of machine learning methods are: logistical regression, support vector machines, random forest, artificial neural networks, boosting, or K-Nearest Neighbor algorithm. The result of predicting the destination is a probability of each destination. The most probable destination is selected as the predicted destination.

Alternatively, the departure time window and the destination can be predicted at the same time, i.e. the probability that the start of the next journey to the predicted destination Z will take place in the predicted departure time window F is calculated directly. In other words, P (next journey to Z within F) is calculated directly. Specifically, for each possible destination Z, a time window $F_Z$ can be sought which maximizes the probability of the next journey to the destination Z starting in the time window $F_Z$. The destination Z, for which the time window $F_Z$ has the highest probability, is predicted as the destination. The simultaneous prediction of the departure time window and the destination has the advantage that a combination of departure time window and destination with the highest probability is found. Another advantage over a calculation with (1) is that P (Journey to Z| Next journey within F) does not need to be approximated by choosing an assumed starting time. In other words, the calculation of the probability for the predicted arrival time window and the predicted destination is preferentially more accurate for large time windows, for example a time window of 2 h. Furthermore, no algorithm for destination prediction is required when the departure time window and the destination are predicted simultaneously.

If the probability of the beginning of the next journey to the predicted destination in the predicted departure time window exceeds a specified threshold value, for example a threshold value of 0.7, the method 100 uses this predicted departure time window to the predicted destination for the further steps of the method 100.

If the probability of the start of the next journey to the predicted destination in the predicted departure time window does not exceed a specified threshold value, for example a threshold value of 0.7, the prediction of the departure time window and the destination can be repeated at specified times and/or in specified time intervals. The departure time window may change over time, even if the vehicle is not moved. For example, if the vehicle was parked in the evening on the previous day and there is a possibility that another journey would take place in the evening, the probability that the next journey on the following morning would be to the destination Work may be lower.

If the prediction of the departure time window takes place in the vehicle, the vehicle would have to be woken up at a later time if the calculation was repeated. This can be avoided by the calculation of future times taking place already when the vehicle is parked, assuming that the vehicle will not be moved before the future time. If the vehicle is parked e.g. at 5 p.m., then a calculation can be made for the future times 5:10 p.m., 5:20 p.m., . . . up to a maximum time horizon of e.g. 24 h from the end of the last journey, in each case assuming that the vehicle has not been moved before this time. The calculation ends as soon as a time window is found that has a probability higher than the threshold. If, contrary to the assumption, a movement of the vehicle at an earlier time is detected, the method will be terminated as described above. This method can also be advantageous when the calculation is performed on a vehicle-external server, as this avoids re-calculations.

If no departure time window and destination have been predicted with a probability higher than the specified threshold value, the departure time window can be incrementally increased up to a specified maximum size before the departure time window and destination are predicted again. For example, the specified maximum size of the departure time window can be 2 h. If a specified initial size of the departure time window is 30 minutes, the departure time window can be increased incrementally from 30 minutes to 60 minutes, 90 minutes, and 120 minutes. The user of the vehicle may, for example, have a usual departure time for a journey from home to work in a departure time window of, for example, 30 minutes and a usual departure time from work to home in a larger departure time window of, for example, 2 hours. A larger departure time window may result in the user receiving a message about the starting time of a predicted route, in which the user will start a journey to the predicted destination with a high probability within the larger departure time window. If no departure time window and destination is predicted with a probability greater than the specified threshold value even for the maximum size of the departure time window, the prediction of the arrival time window and the destination can be repeated at a later time. In this case the departure time window can be increased again, as described above.

Further, the method 100 can ascertain a navigation route of the user of the vehicle to the predicted destination 108. The navigation route can be ascertained using previous navigation routes of the user. If the probability is above a predefined threshold value, for example 0.6 or 0.7, this navigation route is ascertained as the navigation route of the user to the predicted destination. If no navigation route could be determined using past navigation routes of the user, a fastest navigation route can be determined as the user's navigation route.

For the ascertained navigation route of the user of the vehicle to the predicted destination, the method 100 can ascertain 110 an estimated journey time. To ascertain 110 the estimated journey time, the method can retrieve data on current traffic information from a traffic information service, for example from a real-time traffic information service, RITI service for short.

Furthermore, the method 100 can calculate a starting time for ascertaining an estimated journey time. For example, the starting time for ascertaining the estimated journey time can be calculated as follows:

$$\text{Starting time} = \text{Start or center of the predicted departure time window} - \text{Maximum delay due to heavy traffic} - \text{Buffer}.$$

For a small, predicted departure time window of, for example, 30 min, the start of the predicted departure time window can be used for calculating the starting time. For example, for a large, predicted departure time window of, for example, 2 h, the center of the predicted departure time window can be used for calculating the starting time. The use of the center of the predicted departure time window for large departure time windows has the advantage that a notification is not sent to the user too early and the current traffic information has a greater relevance for the start of the journey of the vehicle user. A buffer may be required when calculating the starting time so that the user has sufficient time to reach the vehicle. The buffer can be fixed in advance. Alternatively, the buffer can be set dynamically depending on a current position of the user and/or a current position of the vehicle.

Alternatively, the starting time can also be calculated using the predicted arrival time window:

$$\text{Starting time} = \text{Start/center of the predicted arrival time window} - \text{Usual journey time} - \text{Maximum delay due to heavy traffic} - \text{Buffer}.$$

The calculation of the starting time using the predicted arrival time window may be more accurate if a variance of the arrival time at the predicted destination is less than a variance of the departure time at the predicted destination. Once the starting time for ascertaining the estimated journey time is reached, the method 100 can calculate the estimated journey time and/or query it from the traffic information service at regular intervals.

The method 100 can determine 112 a starting time of the predicted navigation route depending on the ascertained estimated journey time and transmit 114 the message comprising the starting time of the predicted navigation route to the user of the vehicle if the starting time of the predicted navigation route corresponds to a current time. Specifically, the starting time of the predicted navigation route can be calculated as follows:

Starting time of the predicted navigation route=Start or center of the predicted departure time window Ascertained estimated journey time—Buffer.

A current position of the user may differ from a current position of the vehicle. Therefore, before the message is provided to the user, it is also possible to check whether the position of a mobile terminal device of the user is close to the current position of the vehicle. If the position of the mobile terminal device is not close to the current position of the vehicle, the delivery of the message to the user can be prevented. For example, if the user has gone on vacation without the vehicle and the position of the mobile terminal is therefore not close to the current position of the vehicle, the method can prevent the user of the vehicle from receiving messages while on vacation. In addition or alternatively, the user's appointment or calendar entries can be used to prevent incorrect messages being sent to the user. If the current time corresponds to the starting time of the predicted navigation route and/or if none of the above exclusion criteria applies, the method 100 can send the user a message comprising the starting time 114. The message may include additional information about a possible alternative route. Furthermore, the message can be provided on a mobile terminal of the vehicle user and/or on a navigation system of the vehicle. The mobile terminal can be a smartphone, a smartwatch, and/or a pair of augmented reality goggles.

If the user does not start the journey after the message has been delivered, the method 100 can be carried out again after a specified time interval, for example a time interval of 3 h. If the user starts the journey before the message is delivered, the method 100 is interrupted and/or the message is prevented from being transmitted to the user.

Advantageously, the method can provide the user with departure times to destinations which are relevant to the user. Furthermore, the method can prevent the user from receiving unnecessary messages, which efficiently increases the convenience of the method. The user does not need to make any manual entries regarding the destination, navigation route and/or departure time. The user receives the information relevant to the user with regard to the predicted departure time window and the predicted destination automatically.

LIST OF REFERENCE SIGNS

100 method
102 receiving a last vehicle position
104 determining a vehicle location
106 predicting a departure time window and a driving destination
108 ascertaining a navigation route for the user of the vehicle
110 ascertaining the estimated journey time
112 determining a starting time of the predicted navigation route on the basis of the ascertained estimated journey time
114 transmitting the message comprising the starting time of the predicted navigation route to the user of the vehicle

The invention claimed is:

1. A method for providing a message comprising a starting time of a predicted navigation route to a user of a vehicle, the method comprising:

receiving a last vehicle position of a journey of the user using the vehicle;

determining a current vehicle location using the received last vehicle position of the journey of the user, and using stored user-specific data;

predicting, based at least in part on the determined current vehicle location and the stored user-specific data, a departure time window for a start of a next journey, a destination of the next journey, and a probability of the start of the next journey to the predicted destination in the predicted departure time window for the user of the vehicle;

responsive to a condition that the probability of the start of the next journey to the predicted destination in the predicted departure time window exceeds a specified threshold, then:

ascertaining the predicted navigation route of the user of the vehicle to the predicted destination;

ascertaining an estimated journey time of the ascertained navigation route of the user of the vehicle to the predicted destination;

determining the starting time of the predicted navigation route on the basis of the ascertained estimated journey time; and transmitting the message comprising the starting time of the predicted navigation route to the user of the vehicle responsive to a condition that the starting time of the predicted navigation route corresponds to a current time, wherein predicting the departure time window comprises, responsive to the vehicle being parked, calculating a probability of the start of the next journey to the predicted destination for each of a plurality of candidate departure time windows within a specified time horizon, until a candidate departure time window having a probability exceeding the specified threshold is found.

2. The method as claimed in claim 1, the method further comprising:

responsive to a condition that if the probability of the start of the next journey to the predicted destination in the predicted departure time window does not exceed the specified threshold, then:

predicting, on the basis of the determined current vehicle location after expiry of a first, specified time interval, a new departure time window for the start of the next journey, a newly predicted destination of the next journey, and a probability of the start of the next journey to the newly predicted destination in the predicted new time window for the user of the vehicle.

3. The method as claimed in claim 1, wherein ascertaining the navigation route of the user of the vehicle to the predicted destination comprises:

ascertaining a preferred navigation route of the user of the vehicle as the navigation route of the user responsive to a condition that if the preferred navigation route can be determined; and ascertaining a fastest navigation route as the navigation route of the user responsive to a condition that if no preferred navigation route of the user of the vehicle has been ascertained.

4. The method as claimed in claim 3, wherein ascertaining the estimated journey time of the ascertained navigation route of the user of the vehicle to the predicted destination comprises:

determining a starting time for ascertaining the estimated journey time of the ascertained navigation route of the user of the vehicle to the predicted destination; and ascertaining the estimated journey time of the ascertained navigation route of the user of the vehicle to the predicted destination as soon as the starting time for ascertaining the estimated journey time of the ascertained navigation route is reached.

5. The method as claimed in claim 1, further comprising:

terminating a step of the method of claim 1 being performed when a movement of the vehicle is detected, responsive to a condition that the movement of the vehicle is detected.

6. The method as claimed in claim 1, wherein ascertaining the estimated journey time of the ascertained navigation route of the user of the vehicle to the predicted destination comprises:

determining a starting time for ascertaining the estimated journey time of the ascertained navigation route of the user of the vehicle to the predicted destination; and ascertaining the estimated journey time of the ascertained navigation route of the user of the vehicle to the predicted destination as soon as the starting time for ascertaining the estimated journey time of the ascertained navigation route is reached.

7. The method as claimed in claim 6, further comprising: terminating a step of the method of claim 1 being performed when a movement of the vehicle is detected, responsive to a condition that the movement of the vehicle is detected.

8. The method as claimed in claim 1, further comprising: monitoring for the start of the next journey after the message has been transmitted to the user of the vehicle; responsive to a condition that the next journey does not start after the message is provided to the user of the vehicle, then:

predicting, on the basis of the determined current vehicle location after expiry of a second, specified time interval, a new departure time window for the start of the next journey, a new destination of the next journey, and a new probability of the start of the next journey to the predicted new destination in the new predicted time window for the user of the vehicle.

9. The method as claimed in claim 8, wherein ascertaining the estimated journey time of the ascertained navigation route of the user of the vehicle to the predicted destination comprises:

determining a starting time for ascertaining the estimated journey time of the ascertained navigation route of the user of the vehicle to the predicted destination; and ascertaining the estimated journey time of the ascertained navigation route of the user of the vehicle to the predicted destination as soon as the starting time for ascertaining the estimated journey time of the ascertained navigation route is reached.

10. The method as claimed in claim 1, wherein the departure time window is increased responsive to a condition that if no departure time window has been predicted, for which a probability of the start of the next journey to the predicted destination in the predicted departure time window exceeds the specified threshold.

11. The method as claimed in claim 10, wherein ascertaining the estimated journey time of the ascertained navigation route of the user of the vehicle to the predicted destination comprises:

determining a starting time for ascertaining the estimated journey time of the ascertained navigation route of the user of the vehicle to the predicted destination; and ascertaining the estimated journey time of the ascertained navigation route of the user of the vehicle to the predicted destination as soon as the starting time for ascertaining the estimated journey time of the ascertained navigation route is reached.

12. A non-transitory computer-readable medium comprising instructions that, when executed on a computer or a control unit, carry out the method as claimed in claim 1.

13. A system for providing a message comprising a starting time of a predicted navigation route to a user of the vehicle, wherein the system is designed to carry out the method as claimed in claim 1.

14. A vehicle comprising the system for providing a message comprising a starting time of a predicted navigation route to a user of the vehicle as claimed in claim 13.

15. A mobile terminal device comprising the system for providing a message comprising a starting time of a predicted navigation route to a user of the vehicle as claimed in claim 13.

16. The method as claimed in claim 1, wherein ascertaining the estimated journey time of the ascertained navigation route of the user of the vehicle to the predicted destination comprises:

determining a starting time for ascertaining the estimated journey time of the ascertained navigation route of the user of the vehicle to the predicted destination;

obtaining traffic data related to the ascertained navigation route; and ascertaining the estimated journey time of the ascertained navigation route of the user of the vehicle to the predicted destination as soon as the starting time for ascertaining the estimated journey time of the ascertained navigation route is reached based in part on the obtained traffic data.

17. The method as claimed in claim 1, wherein the stored user-specific data comprises a mobility profile of the user of the vehicle, the mobility profile comprising one or more past navigation routes, vehicle locations, or departure times of the user.

18. The method as claimed in claim 1, wherein predicting the destination of the next journey further comprises predicting the destination of the next journey based on seat occupancy of the vehicle.

19. A method for providing a message comprising a starting time of a predicted navigation route to a user of a vehicle, the method comprising:

receiving in a server external to the vehicle a last vehicle position of a journey of the user using the vehicle;

determining in the server a current vehicle location using the received last vehicle position of the journey of the user, and using stored user-specific data;

using the server to predict, based at least in part on the determined current vehicle location and the stored user-specific data, a departure time window for a start of a next journey, a destination of the next journey, and a probability of the start of the next journey to the predicted destination in the predicted departure time window for the user of the vehicle;

responsive to a condition that the probability of the start of the next journey to the predicted destination in the predicted departure time window exceeds a specified threshold, then:

ascertaining in the server the predicted navigation route of the user of the vehicle to the predicted destination;

determining in the server an estimated journey time of the ascertained navigation route of the user of the vehicle to the predicted destination based at least in part on traffic data;

determining in the server a starting time of the predicted navigation route on the basis of the ascertained estimated journey time; and transmitting the message comprising the starting time of the predicted navigation route to the user of the vehicle responsive to a condition that the starting time of the predicted navigation route corresponds to a current time, wherein predicting the departure time window comprises, responsive to the vehicle being parked, calculating a probability of the start of the next journey to the predicted destination for each of a plurality of candidate departure time windows within a specified time horizon, until a candidate departure time window having a probability exceeding the specified threshold is found.

* * * * *